United States Patent Office 2,957,866
Patented Oct. 25, 1960

2,957,866
STRYCHNOS HYDRAZINIUM COMPOUNDS

Bernard Rudner, Pittsburgh, Pa., assignor to W. R. Grace & Co., New York, N.Y., a corporation of Connecticut No Drawing. Filed Oct. 30, 1958, Ser. No. 770,588

9 Claims. (Cl. 260—236)

This invention relates to bridgehead nitrogen compounds. In one specific aspect, it relates to derivatives of strychnos alkaloids which may be called strychnos hydrazinium compounds. This application is a continuation-in-part of my co-pending application Serial No. 547,831, filed November 18, 1955, now U.S. Patent No. 2,891,060.

A bridgehead nitrogen compound is an organic compound, the molecular structure of which contains at least two mutually fused rings sharing a common nitrogen atom (the bridgehead nitrogen) and at least one other atom. The strychnos alkaloids contain such a structure. It has been discovered that strychnos hydrazinium compounds are remarkable central nervous system stimulants.

It is therefore, an object of the present invention to provide a new class of pharmacologically useful compounds.

The compounds of my invention are prepared by the action of chloramine on the appropriate bridgehead nitrogen compound. In the preferred practice of my invention, the reactant amine dissolved in an unreactive solvent is exposed to a stream of gaseous chloramine. The resultant strychnos hydrazinium chloride is isolated by conventional laboratory techniques. Compounds containing anions other than chloride are prepared by metathesis, starting with the chloride and a compound containing the anion to be introduced.

In accordance with the present invention, I have made available a new class of compounds having the general formula:

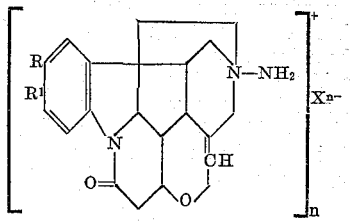

In the above formula, R and R¹ are selected from the group consisting of hydrogen and lower alkoxy. X is an anion bearing the charge $n$; $n$ also represents the number of cations required to balance the anionic charge.

When my compounds are used for pharmaceutical purposes, X must be a pharmaceutically acceptable anion. The primary attributes of such an anion are non-toxicity and pharmaceutical compatibility. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycollate, phosphate, phenylethylbarbiturate, o-acetoxybenzoate, citrate, dialkylbarbiturate, sulfathiazole, theophyllinate, urate, maleate, furmarate, succinate, tartrate, diethylbarbiturate, penicillinate, camphorate, salicylamide, diphenylhydantoin, carbonate, cacodylate, aconitate, sulfamate, gentisate, malate, and the like.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. 1, 59 (1939). Alternatively, the chloramine can be formed in the presence of the amine as described in the copending application Serial No. 605,230, filed August 20, 1956, which teaches the reaction of chlorine and a tertiary amine in the presence of excess ammonia. For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When preformed chloramine is used and good absorption is required for efficient reaction, it has been found desirable to bubble chloramine through a long column of a solution comprising the tertiary amine dissolved in relatively cheap inert solvent. By inert solvent, it is meant a solvent unreactive under the condition of the reaction. Solvents which serve this purpose include hydrocarbons, e.g., heptane, cyclohexane, benzene, xylene and the like; ethers, e.g., diethyl ether, diamyl ether, dioxane and anisol; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and Cellosolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate by metathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

The scope and utility of my invention is further illustrated by the following examples:

Example I

A generator was constructed to produce a gaseous mixture of chloramine and ammonia with nitrogen as a diluent, if desired, using the aforementioned process of Sisler et al. Such a mixture was passed into a solution of 20 g. of brucine in 250 ml. of dimethylformamide. A white solid precipitated as the reaction proceeded and was separated from the reaction mixture by filtration. Chloride analysis showed that the 11.1 g. of precipitate obtained was roughly 1 part N-aminobrucinium chloride combined with roughly three parts of ammonium chloride. Evaporation of the filtrate yielded an additional 22 g. of the hydrazinium salt, almost 80% pure by chloride titration, resulting in an over-all yield of about 85%. The novel bridgehead hydrazinium chloride was recrystallized from absolute alcohol and formed white crystals melting at 261–263° C. N-aminobrucinium chloride is believed to have the following structure:

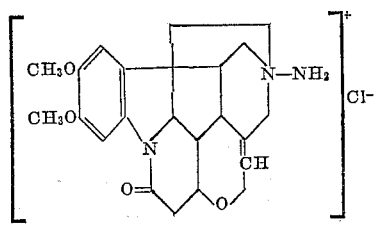

Example II

The chloramine-ammonia gas mixture described in Example I was passed into a solution of 25 g. of brucine in 250 ml. of chloroform. After the reaction mixture had been filtered from the 5 g. of ammonium chloride present, the filtrate was evaporated to leave 31 g. of a white powder. N-aminobrucinium chloride was separated from the unreacted brucine present by taking up the residue in water, filtering from the insoluble brucine and recovering the product by evaporation. Recrystallization of the crude product from methyl alcohol gave N-aminobrucinium chloride dialcoholate which softened and darkened ca. 222° C. and ran clear ca. 245° C. The extremely hygroscopic vacuum-dried, solvent-free product analyzed as follows: 61.88% C, 6.22% H, 8.95% N, and 7.94% Cl. The theoretical analysis for N-aminobrucinium chloride: 61.94% C, 6.33% H, 9.42% N, and 7.95% Cl.

Examples III and IV

Separate portions of the crude chloride of Example I were dissolved in water and treated with aqueous potassium hexafluorophosphate and with saturated aqueous picric acid. The resultant precipitates were collected by filtration and dried to give N-aminobrucinium hexafluorophosphate (M.P. and dec. ca. 200° C.) and N-aminobrucinium picrate (M.P. 245° C.) respectively. The chloride, hexafluorophosphate, and picrate all showed some sublimation below their melting points.

Example V

The chloramine-ammonia gas mixture described in Example I was passed into a solution of 21.3 g. of strychnine in chloroform. After standing three hours, the reaction mixture was filtered and the filtrate evaporated. (The 3.3 g. yellow residue obtained after evaporation was not characterized further.) The 34.4 g. of material isolated by filtration was a high melting solid which analyzed 16.66% chloride and contained ammonium chloride as an impurity. Repeated extractions with hot isopropyl alcohol and evaporation of the combined extracts gave crude N-aminostrychninium chloride which was purified by repeated recrystallization from absolute alcohol. The product darkened ca. 290° C. but did not melt below 320° C.; it analyzed as follows: 65.37% C., 5.90% H, 10.65% N, and 9.17% Cl. Calculated for $C_{21}H_{24}ClN_3O_2$: 65.36% C, 6.27% H, 10.89% N, and 9.19% Cl.

Examples VI and VII

Separate portions of the crude chloride of Example V were dissolved in water and treated with aqueous potassium hexafluorophosphate and with saturated aqueous picric acid. The resultant precipitates were collected by filtration and dried to give N-aminostrychninium hexafluorophosphate (did not melt below 250° C.) and N-aminostrychninium picrate (M.P. 195–196° C.) respectively. The structural formula of the latter is indicated below:

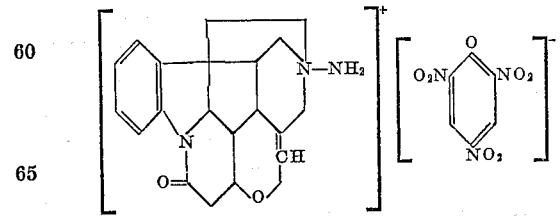

Examples VIII

N-aminostrychninium chloride was dissolved in physiological saline at a concentration of 10 mg./ml. and administered to unstarved male albino mice at doses of 25, 50, 75, and 100 mg./ml. The acute intraperitoneal $LD_{50}$ at 48 hours appeared to be approximately 50 mg./kg. The test compound stimulates the central nervous system.

I claim:
1. Compounds according to claim 9 wherein R and R¹ are hydrogen and X is chloride.
2. Compounds according to claim 9 wherein R and R¹ are lower alkoxy and X is chloride.
3. N-aminobrucinium chloride.
4. N-aminobrucinium hexafluorophosphate.
5. N-aminobrucinium picrate.
6. N-aminostrychninium chloride.
7. N-aminostrychninium hexafluorophosphate.
8. N-aminostrychninium picrate.
9. Compounds having the formula:

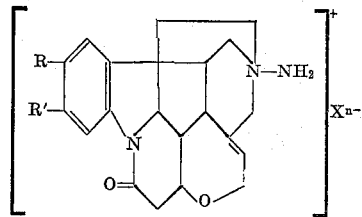

wherein R and R' are selected from the group consisting of hydrogen and lower alkoxy, X is a pharmaceutically acceptable anion and $n$ is a positive integer less than four.

No references cited.

UNITED STATES PATENT OFFICE
CERTIFICATE OF CORRECTION

October 25, 1960

Patent No. 2,957,866

Bernard Rudner

It is hereby certified that error appears in the printed specification of the above numbered patent requiring correction and that the said Letters Patent should read as corrected below.

Column 4, line 68, for "Examples" read -- Example --; column 6, lines 1 to 9, in the structural formula the letter "n" should appear outside the right-hand bracket at the bottom.

Signed and sealed this 25th day of April 1961.

(SEAL)
Attest:

ERNEST W. SWIDER
Attesting Officer

DAVID L. LADD
Commissioner of Patents